United States Patent [19]
Slikkers, Jr.

[11] 3,929,586
[45] Dec. 30, 1975

[54] PROCESS FOR TREATMENT OF ORGANIC SOLVENT-CONTAINING WASTE SLUDGES

[75] Inventor: George Slikkers, Jr., Holland, Mich.

[73] Assignee: Organic Chemicals Company, Inc., Grandville, Mich.

[22] Filed: May 7, 1973

[21] Appl. No.: 357,902

[52] U.S. Cl. .................. 203/37; 71/25; 71/27; 159/1 RW; 203/96; 210/56; 210/71
[51] Int. Cl.² ..... B01D 3/34; C05F 7/00; B01D 5/00
[58] Field of Search ............ 203/36, 37, 29, 33, 95, 203/96, 97; 159/DIG. 10, DIG. 20, DIG. 25, 1 RW, 47 R, 47 WL; 210/56, 10, 71; 71/25, 42, 27, 44, 46, 64 JC

[56] References Cited
UNITED STATES PATENTS

| | | | |
|---|---|---|---|
| 1,905,968 | 4/1933 | Robertson | 202/170 UX |
| 1,907,875 | 5/1933 | Robertson | 202/170 UX |
| 2,094,909 | 10/1937 | Bailey et al. | 159/1 RW |
| 2,315,423 | 3/1943 | Hildebrandt | 203/36 |
| 2,334,620 | 11/1943 | Goodell | 203/37 X |
| 2,444,527 | 7/1948 | Pomeroy | 203/37 X |
| 2,502,484 | 4/1950 | Saunders | 71/25 UX |
| 2,575,244 | 11/1951 | Carlson et al. | 203/37 |
| 2,801,958 | 8/1957 | Fortenbacher et al. | 202/170 |
| 2,922,831 | 1/1960 | Block et al. | 203/36 X |
| 2,992,169 | 7/1961 | Gregory et al. | 203/36 |
| 3,084,109 | 4/1963 | Ure | 203/37 X |
| 3,085,948 | 4/1963 | Kearney | 202/170 D |
| 3,177,126 | 4/1965 | Charreau | 202/170 X |
| 3,196,103 | 7/1965 | Fredenmark et al. | 203/37 X |
| 3,276,973 | 10/1966 | Bormaster et al. | 203/37 |
| 3,311,544 | 3/1967 | Riehl et al. | 203/36 |
| 3,335,070 | 8/1967 | Adams | 203/36 |
| 3,440,148 | 4/1969 | Melacini et al. | 203/37 X |
| 3,442,771 | 5/1969 | Jordan et al. | 203/37 X |
| 3,449,217 | 6/1969 | Harvey | 203/36 X |
| 3,459,639 | 8/1969 | Borrel et al. | 203/37 |
| 3,632,480 | 1/1972 | Suprenant et al. | 202/170 X |
| 3,660,248 | 5/1972 | Tsao | 203/37 X |

Primary Examiner—Jack Sofer
Attorney, Agent, or Firm—Price, Heneveld, Huizenga & Cooper

[57] ABSTRACT

A process for removing organic solvents from solvent-containing waste sludges. A mixture of the sludge, water, and a source of alkali or alkaline earth metal ions is subjected to distillation, the pH of the mixture being greater than 7.

12 Claims, 1 Drawing Figure

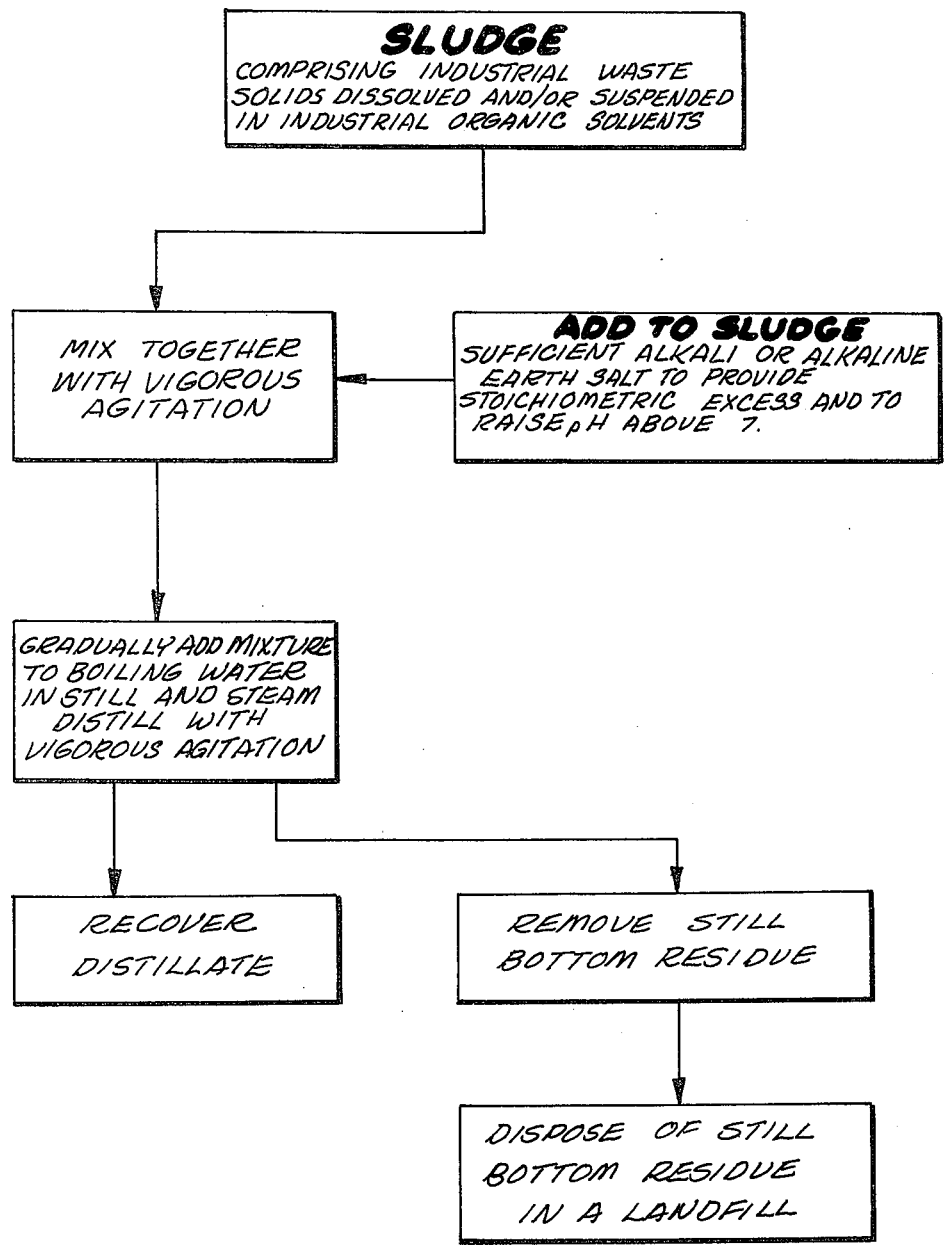

PROCESS FOR TREATMENT OF ORGANIC SOLVENT-CONTAINING WASTE SLUDGES

BACKGROUND OF THE INVENTION

This invention relates to a process for removing organic solvents from organic solvent-containing waste sludges.

In recent years, the increasing concern over the contamination of our environment by man has resulted in a rapid growth of technology directed toward reducing such contamination, especially by industry. However, many contamination problems still remain unsolved, especially in the area of disposal of industrial wastes. One such problem area relates to the disposal of organic solvent-containing waste sludges. The use of organic solvents for cleaning and washing is wide spread in industry today. For example, organic solvents are used in great quantities in the resin and paint industry for washing various apparatus such as kettles and masks or pattern templates which become caked with paint or resin after a certain time of use necessitating periodic washing or cleaning. The organic solvents used for such washing or cleaning become contaminated by such paints or resins and thus create a rather significant disposal problem.

Currently, the contaminated organic solvents are subjected to a variety of known processes such as steam distillation to separate large quantities of the solvents from the waste residues of paints, resins, etc. However, such methods of separation are not operative to achieve complete separation and the sludges remaining after such methods of separation still contain significant quantities of the organic solvents. When these sludges are disposed of in conventional landfills and the like, serious contamination results since the organic solvents eventually leach from the disposed sludges. Thus, there is a definite need for a process for removing greater quantity of the organic solvents from such waste sludges and to treat such waste sludges to render them suitable for safe and uncontaminating disposal to landfills and the like.

SUMMARY OF THE INVENTION

According to the present invention, there is provided a process for removing organic solvents from organic solvent-containing waste sludges such as organic solvent-containing sludges of various paints and resins which renders such sludges suitable for disposal in landfills and the like without a contaminating effect on our environment. The novel process is suitable for removing all types of organic solvents from most organic and inorganic waste sludges.

The process of the present invention comprises subjecting a mixture of the organic solvent-containing waste sludge, water, and a source of alkali or alkaline earth metal ion to distillation, with the pH of the mixture being greater than 7. Preferably, a stoichiometric excess of the metal ion source is provided based on the nonorganic solvent constituents of the sludge, and preferably, about from 2 to 4 gallons of water are employed for every gallon of the sludge. The preferred metal ion sources are the hydroxides of potassium, sodium, calcium, and magnesium, with calcium hydroxide being especially preferred. For most efficient solvent removal, the mixture should be subjected to continuous agitation during the distillation and the pH should preferably be above about 12.

BRIEF DESCRIPTION OF THE DRAWINGS

FIG. 1 is a flow diagram for the process of the present invention.

DESCRIPTION OF THE PREFERRED EMBODIMENT

The process of the present invention is suitable for removing most organic solvents from waste sludges. Representative examples of the organic solvents which may be removed by the process of the present invention include the aliphatics such as pentane, hexane, heptane, and octane; the aromatics such as benzene, toluene, xylene, and napthalene; the esters such as ethyl and methyl acetate and dimethyl pthalate; the ketones such as acetone, methyl ethyl ketone, and methyl isobutyl ketone; the aldehydes such as formaldehyde, and furaldehyde; the alcohols such as methanol, ethanol, propanol, isopropanol, and butyl alcohol; the glycols such as ethylene glycol and propylene glycol; the ethers such as ethyl ether, propyl ether and butyl ether; and the halogenated hydrocarbons such as methylene chloride, propylene bromide, and tetrafluoroethylene.

The process of the present invention is also suitable for removing organic solvents from a wide variety of organic and inorganic waste sludges such as, for example, sludges comprising epoxy resins, polyester resins, phenolic resins, cellulosic fibers, polyolefins, vinyls, acrylics, and organic and inorganic inks and paint pigments.

The process is used to best advantage as a secondary treatment process, i.e., the contaminated organic solvents are first subjected to conventional processes such as distillation to remove much of the organic solvents leaving an organic solvent-containing sludge, which can then be treated according to the process of the present invention. This sludge is then mixed with water and an alkali or alkaline earth metal ion source and is then subjected to distillation. The order of adding the constituents to the mixture is not critical, although it is preferred to add the alkali source to the sludge followed by gradually adding the resultant alkali and sludge mixture to the boiling water to eliminate foaming. The mixture should be vigorously agitated both during the mixing step and the distillation step to insure complete and uniform dispersion of the constituents for complete chemical reaction and solvent release. For example, it has been found that with a two-thousand-gallon mixture, a twenty horse power impellor type of mixer rotated at from about 50 to 150 rpm's produces satisfactory agitation.

While any source of alkali or alkaline earth metal ions can be employed, the hydroxides of potassium, sodium, calcium, and magnesium have been found to be particularly effective, with calcium hydroxide being especially preferred. It is believed that the effectiveness of the process for removing the residual amounts of organic solvents entrained in the waste sludges is due to the release of the organic solvents from entrainment in the sludge by the breakup of the sludge in chemically reacting with the metal ion source to produce various metal salts. For example, when calcium hydroxide is employed, substantial quantities of calcium carbonate are produced by reaction of the calcium with the organic sludge constituents. Thus, for most efficient and complete solvent removal, the metal ion source should be provided in stiochiometric excess to produce maximum chemical breakup of the waste sludge to yield maximum release of the entrained organic solvent, which can then be easily removed by the distillation. The stoichiometric quantities to be added to the mixture will, of course, have to be determined based upon the particular composition of the waste sludge being treated. When calcium hydroxide is employed, it has been found that for most paint and resin sludges, from about 0.5 to 2.5 pounds of calcium hydroxide should be added for every gallon of sludge, with about 1.5 pounds of calcium hydroxide per gallon of sludge being preferred for most of such sludges.

Further, while the process will be operative as long as the pH of the mixture is greater than 7, a pH of greater than 12 is preferred since when the mixture is extremely basic, the metal ions react most quickly with the waste sludge constituents to accelerate the overall process of the solvent removal.

While the exact amount of water employed in the mixture is not critical, enough water should be employed to insure a readily dispersible mixture. Further, enough water should remain after the distillation is ended to suspend and/or solubolize the remaining residue of metal ion compounds produced by the process. For most sludges, it has been found that from about 2 to 4 gallons of water for every gallon of sludge should be employed, with about 3 gallons of water per gallon of sludge being especially satisfactory.

After the mixture has been thoroughly dispersed, it is then subjected to distillation by conventional techniques with conventional apparatus. The distillation is continued until substantially all of the paint or resinous material has reacted with the metal ions and all of the organic solvents have been released and distilled off. The solvent vapors can then be condensed and collected in a conventional manner and recycled for reuse. The suspension of residue remaining in the water after the organic solvents have been distilled off can then be subjected to filtration to remove the solids from the water. The water can then be recycled for reuse, and the solids can be safely disposed of in conventional landfills. It has been found that the use of a calcium ion source, such as calcium hydroxide, is especially preferred for producing solid residues which are best suited for discarding in sanitary landfills because the large amount of insoluble calcium carbonate formed during the process virtually eliminates any adverse leaching.

The following examples further illustrate the process of the present invention:

EXAMPLE 1

150 gallons of industrial waste sludge consisting of about 10% epoxy resin, 25% acetone, and 65% toluol are transferred to a mixing tank, to which 200 pounds of calcium hydroxide are added. This mixture is added over a 60-minute period to 400 gallons of boiling water in an agitated still and then cooked an additional 60 minutes, during which time the sludge changes to a granular form. During the addition period, the temperature drops to approximately 96° C. and then returns to 100° C. during the cooking period. The vapors are passed through a heat exchanger, condensed, and the distillate collected in a storage tank. The lower aqueous layer is separated and can be used as part of the water required for a subsequent run. The upper layer (65 gallons) is a mixture of toluol, acetone, and a very small quantity of water, and may be reserved "as is" or dried as by passing across a tower packed with a dehydrating agent, such as calcium chloride. The granular solids (250 pounds on a dry basis) remaining in the distilland are filtered and discarded to a landfill and the aqueous filtrate is discarded.

EXAMPLE 2

150 gallons of industrial waste sludge consisting of about 1% ink pigments, 25% ethyl acetate, 39% toluol, and 35% propyl acetate are transferred to a mixing tank, to which 150 pounds of calcium hydroxide are added. This mixture is added over a 45-minute period to 400 gallons of boiling water in an agitated still and then cooked an additional 45 minutes, during which time the sludge changes to a granular form. During the addition period, the temperature drops to approximately 94° C. and then returns to 100° C. during the cooking period. The vapors are passed through a heat exchanger, condensed, and the distillate collected in a storage tank. The lower aqueous layer is separated and can be used as part of the water required for a subsequent run. The upper layer (75 gallons) is a mixture of ethyl acetate, toluol, propyl acetate, and a very small quantity of water, and may be reserved "as is" or dried as by passing across a tower packed with a dehydrating agent, such as calcium chloride. The granular solids (200 pounds on a dry basis) remaining in the distilland are filtered and discarded to a landfill and the aqueous filtrate is discarded.

EXAMPLE 3

150 gallons of industrial waste sludge consisting of about 1% acrylic resin, 20% acetone, 20% methyl ehtyl ketone, and 59% toluol are transferred to a mixing tank, to which 100 pounds of calcium hydroxide are added. This mixture is added over a 45-minute period to 500 gallons of boiling water in an agitated still and then cooked an additional 30 minutes, during which time the sludge changes to a granular form. During the addition period, the temperature drops to approximately 91° C. and then returns to 100° C. during the cooking period. The vapors are passed through a heat exchanger, condensed, and the distillate collected in a storage tank. The lower aqueous layer is separated and can be used as part of the water required for a subsequent run. The upper layer (60 gallons) is a mixture of acetone, methyl ethyl ketone, toluol, and a small quantity of water, and may be reserved "as is" or dried as by passing across a tower packed with a dehydrating agent, such as calcium chloride. The granular solids (175 pounds on a dry basis) remaining in the distilland are filtered and discarded to a landfill and the aqueous filtrate is discarded.

EXAMPLE 4

250 gallons of industrial waste sludge consisting of about 1% vinyl resin, 90% methyl ethyl ketone, 5% toluol, and 4% methyl isobutyl ketone are transferred to a mixing tank to which 200 pounds of calcium hydroxide are added. This mixture is added over a 60-minute period to 500 gallons of boiling water in an agitated still and then cooked an additional 45 minutes, during which time the sludge changes to a granular form. During the addition period, the temperature drops to approximately 90° C. and then returns to 100° C. during the cooking period. The vapors are passed through a heat exchanger, condensed, and the distillate collected in a storage tank. The lower aqueous layer is separated and can be used as part of the water required for a subsequent run. The upper layer is a mixture of methyl ethyl ketone, toluol, methyl isobutyl ketone, and water. It is dried by passing across a tower packed with a dehydrating agent (such as calcium chloride) and yields 155 gallons. The granular solids (325 pounds on a dry basis) are filtered and discarded to a landfill and the aqueous filtrate is discarded.

EXAMPLE 5

150 gallons of industrial waste sludge consisting of about 1% fiberglass resins and 99% acetone are transferred to a mixing tank, to which 50 pounds of calcium hydroxide are added. This mixture is added over a 30-minute period to 450 gallons of boiling water in an agitated still and then cooked an additional 30 minutes, during which time the sludge changes to a granular form. During the addition period, the temperature drops to approximately 85° C. and then returns to 100° C. during the cooking period. The vapors are passed through a heat exchanger, condensed, and the distillate collected in a storage tank. The distillate is then passed across a fractionating column, collecting the fraction boiling at 56° to 57° C. as acetone (75 gallons). The column bottoms are used as part of the water for a subsequent run. The granular solids (125 pounds on a dry basis) remaining in the distilland are filtered and discarded to a landfill and the aqueous filtrate is discarded.

EXAMPLE 6

150 gallons of industrial waste sludge consisting of about 10% organic and organic paint pigments, 25% acetone, and 65% toluol are transferred to a mixing tank, to which 200 pounds of calcium hydroxide are added. This mixture is added over a 60-minute period to 400 gallons of boiling water in an agitated still and then cooked an additional 60 minutes, during which time the sludge changes to a granular form. During the addition period, the temperature drops to approximately 95° C. and then returns to 100° C. during the cooking period. The vapors are passed through a heat exchanger, condensed, and the distillate collected in a storage tank. The lower aqueous layer is separated and can be used as part of the water required for a subsequent run. The upper layer (60 gallons) is a mixture of acetone, toluol, and a very small quantity of water, and may be reserved "as is" or dried as by passing across a tower packed with a dehydrating agent, such as calcium chloride. The granular solids (250 pounds on a dry basis) remaining in the distilland are filtered and discarded to a landfill and the aqueous filtrate is discarded.

In the above examples, the hydroxides of potassium, sodium, and magnesium can be substituted for the calcium hydroxide with similar results.

It will be obvious to those skilled in the art, that various modifications and changes can be made in the process of the present invention without departing from the spirit thereof. Accordingly, the scope of the present invention is deemed to be limited only by the appended claims.

The embodiments of the invention in which an exclusive property or privilege is claimed are defined as follows:

1. An industrial process for recovering land fill suitable solids from sludges composed of industrial waste solids and industrial organic solvents, said process comprising: mixing an alkali or alkaline earth metal salt into a sludge, said sludge being comprised of industrial waste solids selected from the group consisting of epoxy resins, polyester resins, phenolic resins, cellulosic fibers, polyolefins, vinyls, acrylics, and organic and inorganic ink and paint pigments, and being at least one of dissolved and suspended in industrial organic solvents selected from the group consisting of aliphatics, aromatics esters, ketones, aldehydes, alcohols, glycols, ethers and halogenated hydrocarbons, said mixing step including adding sufficient alkali or alkaline earth metal salt to provide a stoichiometric excess thereof based on the industrial waste solid constituents of said sludge and to create a mixture having a pH greater than 7; gradually adding the resultant mixture to boiling water in a still and effecting steam distillation of the resultant mixture; vigorously agitating said sludge and said alkali or alkaline earth metal salt during and in said mixing step and during said distillation step; recovering the industrial organic solvent through said steam distillation step; removing the still-bottom residue, comprising said industrial waste solids substantially organic solvent free, from the still and disposing of said solids in a land fill.

2. The process of claim 2 in which said vigorous agitating is performed with an impeller-type mixer operated at 50 to 150 rpm.

3. The process of claim 1 which includes the step of separating said industrial solids from any water remaining from said boiling water media following said distillation step, said separation following removal of said still-bottom residue from said still.

4. The process of claim 1 in which the amount of water used in said steam distillation step is sufficient that after distillation has been completed, there is sufficient water remaining to suspend and/or solubilize the residue of said ion source used in said process.

5. The process of claim 1 in which two to four gallons of water are used as said boiling water media for every gallon of sludge which is introduced thereinto.

6. The process of claim 1 wherein sufficient quantities of said alkali or alkaline earth metal ion source are added to said sludge to raise the pH of the resulting mixture above about 12.

7. The process according to claim 1 wherein an amount of said metal ion source is added which is stoichiometrically equivalent to from about 0.5 to 2.5 pounds of calcium hydroxide per gallon of said sludge.

8. The process of claim 1 wherein said metal ion source is selected from the group consisting of the hydroxides of potassium, sodium, calcium and magnesium.

9. An industrial process for recovering landfill suitable solids from a sludge, said sludge being composed of industrial waste solids and industrial organic solvent, said process comprising: placing a sludge in a still, said sludge being comprised of industrial waste solids selected from the group consisting of epoxy resins, polyester resins, phenolic resins, cellulosic fibers, polyolefins, vinyls, acrylics, and organic and inorganic ink and paint pigments and being at least one of dissolved and suspended in industrial organic solvent selected from the group consisting of aliphatics, aromatics, esters, ketones, aldehydes, alcohols, glycols, ethers and halogenated hydrocarbons, distilling said sludge in said still to thereby separate said sludge into a distilled solvent which comprises a majority of said solvent originally present in said sludge, and which is recovered, and a still-bottom sludge which comprises said solids and the remainder of said solvent; mixing an alkali or alkaline earth metal salt into said still-bottom sludge with vigorous agitation and in an amount sufficient to provide a stoichiometric excess thereof based on the industrial waste solid constituents of said still-bottom sludge and to create a mixture whose pH is greater than 7; gradually adding the resultant mixture to boiling water in a still and effecting steam distillation of the resultant mixture and continuing said vigorous agitation during and in said distilling step; recovering said remainder of said industrial organic solvent through said distillation step; and removing the still-bottom residue, comprising said industrial waste solids substantially organic solvent free, from the still and disposing of said solids in a land fill.

10. The method of claim 9 in which the amount of water used in said steam distillation step is sufficient that after distillation has been completed, there is sufficient water remaining to suspend and/or solubilize the residue of said ions used in said process.

11. The process of claim 9 in which two to four gallons of water are used as said boiling water media for every gallon of still-bottom sludge which is introduced thereinto.

12. The process of claim 9 wherein sufficient quantities of said alkali or alkaline earth metal ions are added to said still-bottom sludge to raise the pH of the resulting mixture above about 12.

* * * * *

UNITED STATES PATENT AND TRADEMARK OFFICE
CERTIFICATE OF CORRECTION

PATENT NO. : 3,929,586
DATED : December 30, 1975
INVENTOR(S) : George Slikkers, Jr.

It is certified that error appears in the above-identified patent and that said Letters Patent are hereby corrected as shown below:

Column 4, line 33:

"ehtyl" should be ---ethyl---;

Claim 1, Column 6, line 9:

After "aromatics" insert ---,---;

Claim 2, Column 6, line 25:

"2" should be ---1---.

Signed and Sealed this eighteenth Day of May 1976

[SEAL]

Attest:

RUTH C. MASON
*Attesting Officer*

C. MARSHALL DANN
*Commissioner of Patents and Trademarks*